United States Patent
Gao et al.

(10) Patent No.: US 12,244,543 B1
(45) Date of Patent: Mar. 4, 2025

(54) MESSAGE 3 ENHANCEMENT

(71) Applicant: Nokia Technologies Oy, Espoo (FI)

(72) Inventors: Jie Gao, Hangzhou (CN); Nhat-Quang Nhan, Reims (FR); Claudio Rosa, Randers (DK); Jing Yuan Sun, Beijing (CN); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/932,708

(22) Filed: Oct. 31, 2024

(30) Foreign Application Priority Data

Nov. 3, 2023 (WO) ................ PCT/CN2023/129570

(51) Int. Cl.
*H04W 74/08* (2024.01)
*H04L 1/00* (2006.01)
*H04L 5/14* (2006.01)
*H04W 74/0833* (2024.01)

(52) U.S. Cl.
CPC .............. *H04L 5/14* (2013.01); *H04L 1/0003* (2013.01); *H04W 74/0833* (2013.01); *H04W 74/0866* (2013.01)

(58) Field of Classification Search
CPC .... H04L 5/14; H04L 1/0003; H04W 74/0833; H04W 74/0866
See application file for complete search history.

(56) References Cited

U.S. PATENT DOCUMENTS

2022/0330211 A1  10/2022 Awad et al.
2023/0319795 A1  10/2023 Zhang et al.
2023/0370240 A1*  11/2023 Abotabl .................. H04L 5/001
2024/0129958 A1*  4/2024 Zheng .................... H04L 5/0028
2024/0276462 A1*  8/2024 Mondet ............ H04W 72/0446
(Continued)

FOREIGN PATENT DOCUMENTS

CN         114364050 A     4/2022
WO    WO-2024212117 A1 *  10/2024  ............... H04L 5/00

OTHER PUBLICATIONS

Huawei et al. "Resource multiplexing between backhaul and access for IAB duplexing enhancements" 3GPP TSG RAN WG1 Meeting #102-e, R1-2005260, Aug. 28, 2020 (Aug. 28, 2020), the whole document.

(Continued)

*Primary Examiner* — Walli Z Butt
(74) *Attorney, Agent, or Firm* — Robert P. Michal, Esq.; Carter, DeLuca & Farrell LLP

(57) ABSTRACT

Example embodiments of the present disclosure relate to, apparatuses methods and computer readable medium for Message 3 enhancement. In a method, a first apparatus transmits, to a second apparatus, a random access request in at least one of a non-subband non-overlapping full duplex (non-SBFD) resource or a subband non-overlapping full duplex (SBFD) resource. The first apparatus receives, from the second apparatus, information indicating a part of at least one of the SBFD resource or the non-SBFD resource, wherein the part of the at least one of the SBFD resource or the non-SBFD resource is to be used for an additional Message 3 transmission. The first apparatus performs the additional Message 3 transmission to the second apparatus in the part of the at least one of the SBFD resource or the non-SBFD resource.

20 Claims, 8 Drawing Sheets

(56) References Cited

U.S. PATENT DOCUMENTS

2024/0291625 A1* 8/2024 Zhou .................... H04L 5/0094

OTHER PUBLICATIONS

International Search Report issued by the China National Intellectual Property Administration acting as the International Searching Authority in relation to International Application No. PCT/CN2023/129570 dated Jul. 23, 2024 (3 pages).
Written Opinion of the International Searching Authority issued by the China National Intellectual Property Administration acting as the International Searching Authority in relation to International Application No. PCT/CN2023/129570 dated Jul. 23, 2024 (3 pages).

* cited by examiner

MESSAGE 3 ENHANCEMENT

CROSS-REFERENCE TO RELATED APPLICATIONS

This application claims priority to Chinese Patent Application No. PCT/CN2023/129570, filed Nov. 3, 2023, the disclosure of this application is expressly incorporated herein by reference in its entirety.

FIELDS

Various example embodiments of the present disclosure generally relate to the field of telecommunication and in particular, to apparatuses, methods and computer readable medium for message 3 enhancement.

BACKGROUND

Two contention based random access (CBRA) procedures are supported in wireless communication systems, namely 4-step random access procedure and 2-step random access procedure.

SUMMARY

In a first aspect of the present disclosure, there is provided a first apparatus. The first apparatus comprises at least one memory storing instructions that, when executed by the at least one processor, cause the first apparatus at least to: transmit, to a second apparatus, a random access request in at least one of a non-subband non-overlapping full duplex (non-SBFD) resource or a subband non-overlapping full duplex (SBFD) resource; receive, from the second apparatus, information indicating a part of at least one of the SBFD resource or the non-SBFD resource, wherein the part of the at least one of the SBFD resource or the non-SBFD resource is to be used for an additional Message 3 transmission; and perform the additional Message 3 transmission to the second apparatus in the part of the at least one of the SBFD resource or the non-SBFD resource.

In a second aspect of the present disclosure, there is provided a second apparatus. The second apparatus comprises at least one processor; and at least one memory storing instructions that, when executed by the at least one processor, cause the second apparatus at least to: receive, from a first apparatus, a random access request in at least one of a non-subband non-overlapping full duplex (non-SBFD) resource or a subband non-overlapping full duplex (SBFD) resource; transmit, to the first apparatus, information indicating a part of at least one of the SBFD resource or the non-SBFD resource, wherein the part of the at least one of the SBFD resource or the non-SBFD resource is to be used for an additional Message 3 transmission; and receive, from the first apparatus, the additional Message 3 transmission in the part of the at least one of the SBFD resource or the non-SBFD resource.

In a third aspect of the present disclosure, there is provided a method. The method comprises transmitting, to a second apparatus, a random access request in at least one of a non-subband non-overlapping full duplex (non-SBFD) resource or a subband non-overlapping full duplex (SBFD) resource; receiving, from the second apparatus, information indicating a part of at least one of the SBFD resource or the non-SBFD resource, wherein the part of the at least one of the SBFD resource or the non-SBFD resource is to be used for an additional Message 3 transmission; and performing the additional Message 3 transmission to the second apparatus in the part of the at least one of the SBFD resource or the non-SBFD resource.

In a fourth aspect of the present disclosure, there is provided a method. The method comprises receiving, from a first apparatus, a random access request in at least one of a non-subband non-overlapping full duplex (non-SBFD) resource or a subband non-overlapping full duplex (SBFD) resource; transmitting, to the first apparatus, information indicating a part of at least one of the SBFD resource or the non-SBFD resource, wherein the part of the at least one of the SBFD resource or the non-SBFD resource is to be used for an additional Message 3 transmission; and receiving, from the first apparatus, the additional Message 3 transmission in the part of the at least one of the SBFD resource or the non-SBFD resource.

In a fifth aspect of the present disclosure, there is provided a first apparatus. The first apparatus comprises means for transmitting, to a second apparatus, a random access request in at least one of a non-subband non-overlapping full duplex (non-SBFD) resource or a subband non-overlapping full duplex (SBFD) resource; means for receiving, from the second apparatus, information indicating a part of at least one of the SBFD resource or the non-SBFD resource, wherein the part of the at least one of the SBFD resource or the non-SBFD resource is to be used for an additional Message 3 transmission; and means for performing the additional Message 3 transmission to the second apparatus in the part of the at least one of the SBFD resource or the non-SBFD resource.

In a sixth aspect of the present disclosure, there is provided a second apparatus. The second apparatus comprises means for receiving, from a first apparatus, a random access request in at least one of a non-subband non-overlapping full duplex (non-SBFD) resource or a subband non-overlapping full duplex (SBFD) resource; means for transmitting, to the first apparatus, information indicating a part of at least one of the SBFD resource or the non-SBFD resource, wherein the part of the at least one of the SBFD resource or the non-SBFD resource is to be used for an additional Message 3 transmission; and means for receiving, from the first apparatus, the additional Message 3 transmission in the part of the at least one of the SBFD resource or the non-SBFD resource.

In a seventh aspect of the present disclosure, there is provided a computer readable medium. The computer readable medium comprises instructions stored thereon for causing an apparatus at least to perform the third aspect or the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
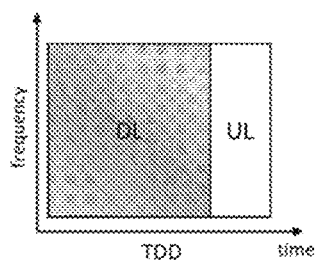
FIG. 1A illustrates example Time Division Duplexing according to some example embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory (ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

In fifth Generation Mobile Communication Technology (5G) new radio (NR), as mentioned above, two CBRA procedures are supported, namely 4-step random access procedure (i.e., RACH) and 2-step random access procedure.

In the 4-step RACH, a UE may send a specific preamble in a Message 1 (Msg1) to the gNB via a Physical Random Access Channel (PRACH) using a specific resource called RACH occasion (RO). The gNB may respond to the UE with a random access response (RAR) message, which may also be called as Message 2 (Msg2). The Msg2 may include the detected preamble ID, the time-advance command, a Temporary Cell-Radio Network Temporary Identifier (TC-RNTI) and UL grant for the transmission of Msg3 on Physical Uplink Shared Channel (PUSCH). Then the UE may respond to Msg2 over the scheduled PUSCH with an ID for contention resolution for a Radio Resource Control (RRC) request, which may also be called as Msg3. The gNB may transmits the contention resolution message with the contention-resolution ID for an RRC setup, which may also be referred to as a Message 4 (Msg4).

Upon reception of the Msg4, the UE may send an acknowledgement (ACK) on a Physical Uplink Control Channel (PUCCH) if its contention-resolution ID is carried by Msg4. This completes the 4-step RACH. Furthermore, prior to Msg1, there is also a preliminary step of sending (at gNB) and receiving (at UE) the synchronization signal block (SSB), comprising DL beam sweeping, which is not formally part of the RACH procedure. As a result of this preliminary step, the UE may select the index of the preferred SSB beam and decode the associated Physical Broadcast Channel (PBCH) for Master Information Block (MIB), subsequently receive and decode the System Information Block (SIB) and so on. This index is also used by UE to identify a suitable RO for the preamble transmission (i.e., Msg1), according to the SSB-to-RO mapping conveyed by SIB1. The gNB may use the SSB beam index selected by the UE for the Msg2 transmission.

In the 2-step random access procedure, Msg1 and Msg3 are combined in a MsgA and sent out without waiting for feedback from the gNB in between (traditionally Msg2). Similarly, the gNB may combine Msg2 and Msg4 into Message B (MsgB).

Figure 1B:
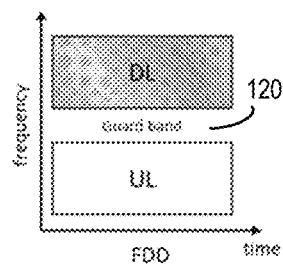
FIG. 1B illustrates example Frequency Division Duplexing according to some example embodiments of the present disclosure.

For duplexing evolution including subband non-overlapping full duplex (SBFD), two duplexing modes are supported in 5G NR, including Frequency Division Duplexing (FDD) for paired bands and Time Division Duplexing (TDD) for unpaired bands. FIG. 1A illustrates example Time Division Duplexing according to some example embodiments of the present disclosure. In TDD, as shown in FIG. 1A, the time domain resource is split between downlink and uplink. Allocation of a limited time duration for the uplink in TDD would result in reduced coverage, increased latency, and reduced capacity. FIG. 1B illustrates example Frequency Division Duplexing according to some example embodiments of the present disclosure. In FDD, as shown in FIG. 1B, uplink and downlink transmission are allowed at the same time over different frequency bands which is separated by a grand band 120. Frequency bands are generally inflexible to change which may result in higher complexity and high cost.

Figure 1C:
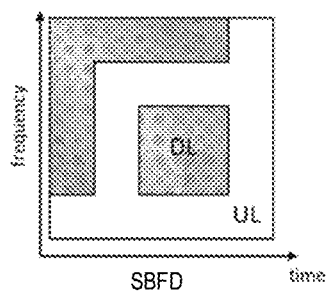
FIG. 1C illustrates example subband non-overlapping full duplex according to some example embodiments of the present disclosure.

Motivated by this, one of the objectives of the evolution of duplexing operation in NR that addresses the challenges above is to allow simultaneous downlink and uplink transmission on different physical resource blocks (PRBs)/subbands within an unpaired wideband NR cell. FIG. 1C illustrates example subband non-overlapping full duplex according to some example embodiments of the present disclosure. In SBFD, as shown in FIG. 1C, downlink an uplink are operated simultaneously on the same time division duplex carrier on different frequency resources. This duplexing scheme may be also referred to as cross division duplexing (xDD) scheme or flexible division duplexing (FDU).

Figure 2:
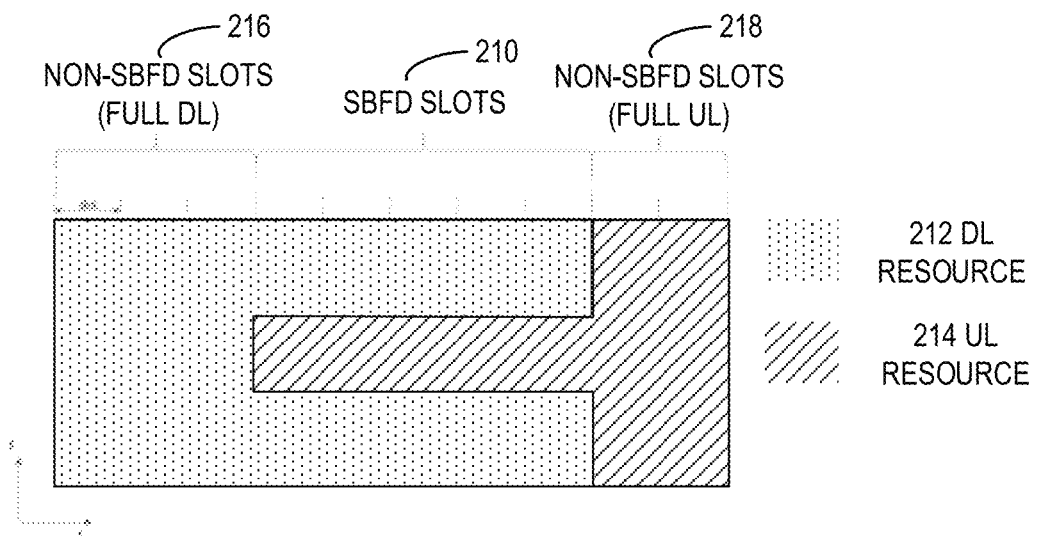
FIG. 2 illustrates a schematic diagram of subband non-overlapping full duplex and non-subband non-overlapping full duplex slots according to some example embodiments of the present disclosure.

In SBFD, there may be two slot types for both downlink and uplink transmissions. FIG. 2 illustrates a schematic diagram of subband non-overlapping full duplex and non-subband non-overlapping full duplex slots according to some example embodiments of the present disclosure. As shown in FIG. 2, during SBFD slots 210, the non-overlapping downlink subband(s) 212 and uplink subband(s) 214 both exist. During Non-SBFD slots 216 and 218, the entire band is used for either downlink or uplink (for example, legacy/full DL/UL slots). In this example, full Non-SBFD slots 216 are used for downlink transmission and full Non-SBFD slots 218 are used for uplink transmission.

Several SBFD operation modes have been studied including whether time and frequency locations of subbands for the SBFD operation are known to the SBFD-aware UE or not, and it is agreed that at least the operation mode with time and frequency locations of subbands for SBFD operation being known to the SBFD-aware UE is prioritized. This means that SBFD slots should be known by the UE (for example, SBFD-aware UE) in some way.

In Release-17 (Rel-17), PUSCH repetitions for Msg3 in form of PUSCH repetition type A counted on available slots are introduced. The Msg3 initial transmission is granted by Medium Access Control (MAC) Random Access Response (RAR) in Msg2, while the Msg3 retransmission is granted by Downlink Control Information (DCI) format 0_0 scrambled by TC-RNTI. Because the Msg3 initial transmission and the Msg3 retransmission are granted differently, different approaches may be adopted for indicating number of Msg3 PUSCH repetitions for the Msg3 initial transmission and retransmission.

TABLE 1 number of repetitions K as a function of 2 Most Significant Bits (MSBs) of a Modulation and Coding Scheme (MCS) information field in an RAR UL grant

| numberOfMsg3Repetitions is configured | | numberOfMsg3Repetitions is not configured | |
| --- | --- | --- | --- |
| Codepoint | K | Codepoint | K |
| 00 | First value of numberOfMsg3Repetitions | 00 | 1 |
| 01 | Second value of numberOfMsg3Repetitions | 01 | 2 |
| 10 | Third value of numberOfMsg3Repetitions | 10 | 3 |
| 11 | Fourth value of numberOfMsg3Repetitions | 11 | 4 |

For Msg3 initial transmission, the 2 MSBs of the MCS information field in the RAR uplink grant provide a codepoint to determine the number of repetitions K according to the above Table 1, based on whether or not the higher layer parameter numberOfMsg3-RepetitionsList is configured. If numberOfMsg3-RepetitionsList is configured, the 2 MSBs point to a list of values configured in numberOfMsg3-RepetitionsList. Otherwise, the 2 MSBs point to a default list of values from 1 to 4. In this case, given that the RAR UL grant has 4 bits, the 2 LSBs of this field is used for indicating MCS index according to the following Table 2.

TABLE 2

MCS index as a function of 2 Least Significant Bits (LSBs) of an MCS information field in an RAR UL grant.

| mcs-Msg3Repetition is configured | | mcs-Msg3Repetitions is not configured | |
| --- | --- | --- | --- |
| Codepoint | $I_{MCS}$ | Codepoint | $I_{MCS}$ |
| 00 | First value of mcs-Msg3Repetition | 00 | 0 |
| 01 | Second value of mcs-Msg3Repetition | 01 | 1 |
| 10 | Third value of mcs-Msg3Repetition | 10 | 2 |
| 11 | Fourth value of mcs-Msg3Repetition | 11 | 3 |

For the Msg3 retransmission, the 2 MSBs of the MCS information field in DCI format 0_0 scrambled by TC-RNTI provide a codepoint to determine the number of repetitions K according to the above Table 1, based on whether or not the higher layer parameter numberOfMsg3-RepetitionsList is configured, similar to the case for the initial transmission. In this case, given that MCS information field in DCI format 0_0 has 5 bits, the 3 LSBs of this field is used for indicating MCS index according to Table 3.

TABLE 3

MCS index as a function of 3 LSBs of MCS information field in DCI format 0_0 scrambled by TC-RNTI.

| mcs-Msg3Repetition is configured | | mcs-Msg3Repetitions is not configured | |
|---|---|---|---|
| Codepoint | $I_{MCS}$ | Codepoint | $I_{MCS}$ |
| 000 | First value of mcs-Msg3Repetition | 000 | 0 |
| 001 | Second value of mcs-Msg3Repetition | 001 | 1 |
| 010 | Third value of mcs-Msg3Repetition | 010 | 2 |
| 011 | Fourth value of mcs-Msg3Repetition | 011 | 3 |
| 100 | Fifth value of mcs-Msg3Repetition | 100 | 4 |
| 101 | Sixth value of mcs-Msg3Repetition | 101 | 5 |
| 110 | Seventh value of mcs-Msg3Repetition | 110 | 6 |
| 111 | Eighth value of mcs-Msg3Repetition | 111 | 7 |

In summary, the resource for Msg3 indicated in the RAR (for initial transmission) or DCI format 0_0 with CRC scrambled by TC-RNTI (for retransmission) is repeated by a number of repetitions. The number of repetitions is counted on available UL slots/resources and the value is indicated by repurposing the MCS information field in the RAR UL grant or DCI format 0_0.

For initial access in uplink subband, it is assumed that SBFD-aware UEs can transmit Msg1 in uplink subband of SBFD slots, and an SBFD slot is defined as a slot where some PRBs are used for downlink transmission while other PRBs are used for uplink reception at the gNB. During the initial access process in SBFD slots, the following cases may happen.

Case 1: the uplink subband is known to SBFD-aware UEs via SIB1. SBFD-aware UEs are configured to only send PRACH preamble/Msg1 on SBFD slots.

Case 2: the uplink subband is known to SBFD-aware UEs via SIB1. SBFD-aware UEs may send PRACH preamble/Msg1 on SBFD slots and/or legacy uplink slots.

Case 3: SBFD-aware UEs are configured to transmit PRACH only in ROs on legacy uplink slots/symbols.

While transmitting PRACH preamble/Msg1 in legacy uplink slots, the SBFD-aware UEs may use the same PRACH resources as used by legacy UEs (i.e., non-SBFD-aware UEs). For Case 1, forcing SBFD-aware UEs to always send PRACH on SBFD slots may be too restrictive and may reduce the advantages in terms of latency, collision probability and coverage.

For Case 2 and Case 3, there is an issue when SBFD-aware UEs may also use legacy uplink slots for the transmission of Msg1. In this case, upon detecting the transmission of PRACH preamble on PRACH resources in a legacy uplink slot, the gNB does not know whether the UE is an SBFD-aware UE or not and it may only schedule Msg3 in legacy uplink slots, thus making the uplink subband being useless for initial access (for example, not used for Msg1 nor Msg3).

Therefore, a new solution is needed for the network to identify the SBFD-aware UE earlier without occupying additional resources.

Example embodiments of the present disclosure propose a new MSG3 process for SBFD. With this process, a random access request in at least one of a non-SBFD resource or an SBFD resource is transmitted from a first apparatus (for example, a terminal device) to a second apparatus (for example, a network device). Upon receiving information indicating a part of at least one of the SBFD resource or the non-SBFD resource from the second apparatus by the first apparatus, the first apparatus performs an additional Message 3 transmission to the second apparatus in the part of the at least one of the SBFD resource or the non-SBFD resource.

In this way, the part of the at least one of the SBFD resource or the non-SBFD resource to be used for an additional Message 3 transmission may be identified by the second apparatus earlier without occupying additional PRACH resources, thereby optimizing MSG3 coverage enhancement and increasing reliability and reducing initial access latency.

Figure 3:
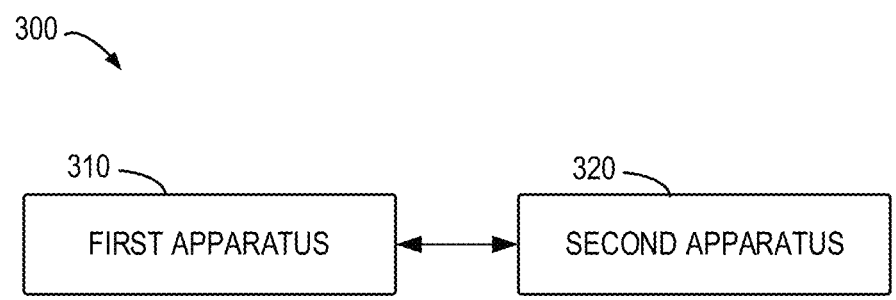
FIG. 3 illustrates an example communication environment in which example embodiments of the present disclosure can be implemented.

Example embodiments will be discussed in detailed below with reference to the accompanying figures. FIG. 3 illustrates an example communication environment 300 in which example embodiments of the present disclosure can be implemented.

The communication environment 300 comprises a first apparatus 310 and a second apparatus 320. In some example embodiments, the first apparatus 310 may operate as a terminal device, for example, an SBFD-aware UE. The apparatus 320 may operate as a network device, for example, a gNB.

It is to be understood that the number and types of apparatuses are shown in FIG. 3 for the purpose of illustration without suggesting any limitation. For example, the communication environment 300 may include any suitable number of first apparatuses and second apparatuses.

In some example embodiments, a link from the first apparatus 310 to the second apparatus 320 may be referred to as an uplink (UL), and a link from the second apparatus 320 to the first apparatus 310 may be referred to as a downlink (DL). In UL, the second apparatus 320 is a RX device (or a receiver) and the first apparatus 310 is a TX device (or a transmitter). In DL, the second apparatus 320 is a transmitting (TX) device (or a transmitter) and the first apparatus 310 is a receiving (RX) device (or a receiver).

In the following, for the purpose of illustration, some example embodiments are described with the first apparatus 310 operating as a terminal device, and the second apparatus 320 operating as a network device. However, in some example embodiments, operations described with respect to a terminal device may be implemented at a network device or other devices, and operations described with respect to a network device may be implemented at a terminal device or other devices.

The first apparatus 310 and the second apparatus 320 can communicate with each other. Communications in the communication environment 300 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 4:
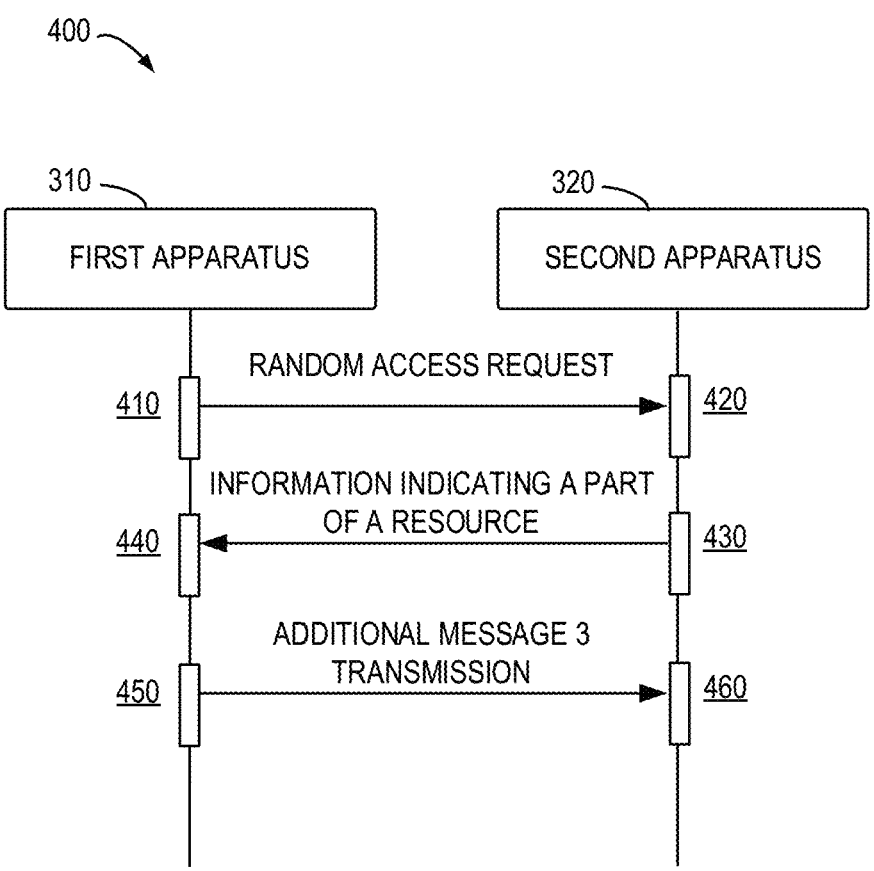
FIG. 4 illustrates a signaling diagram for communication according to some example embodiments of the present disclosure.

Reference is now made to FIG. 4, which illustrates a signaling diagram 400 for communication according to some example embodiments of the present disclosure. As shown in FIG. 4, the signaling diagram 400 involves the first apparatus 310 and the second apparatus 320 in the communication environment 300.

As shown in FIG. 4, the first apparatus 310 transmits (410), to the second apparatus 320, a random access request in at least one of a non-SBFD resource or a SBFD resource. For example, the first apparatus 310 may transmit a specific preamble including the random access request in at least one of a non-SBFD resource or a SBFD resource to the second apparatus 320 via PRACH. The non-SBFD resource may include non-SBFD symbol and/or non-SBFD slots, while the SBFD resource may include at least one of a plurality of SBFD symbol and/or a plurality of SBFD slots.

Upon receiving (420) the random access request in at least one of a non-SBFD resource or a SBFD resource, the second apparatus 320 transmits (430), to the first apparatus 310, information indicating a part of at least one of the SBFD resource or the non-SBFD resource. The part of the at least one of the SBFD resource or the non-SBFD resource is to be used for an additional Message 3 transmission.

In some example embodiments, the additional Message 3 transmission comprises at least one of a repeated transmission of first Message 3 or a transmission of second Message 3. In some example embodiments, the first Message 3 or the second Message 3 comprises Message 3. For example, the first Message 3 may be Message 3 making response to Message 2 over the scheduled PUSCH with an ID for contention resolution. The repeated transmission of first Message 3 may be Message 3 repetition, and the second Message 3 may be twin Message 3. In some example embodiments, the second Message 3 may be transmitted using resources independent of resources for the first Message 3. For example, twin MSG3 transmission may be an independent transmission with independent resource position, resource number, or MCS.

In some example embodiments, the first apparatus 310 may receive a random access configuration, and the random access configuration may indicate the at least one of the SBFD resource or the non-SBFD resource. For example, the random access configuration may be indicated by the second apparatus 320.

In some example embodiments, the random access configuration may include the information indicating the part of the at least one of the SBFD resource or the non-SBFD resource. For example, the information may include at least one parameter indicating to the first apparatus 310 to transmit the second Message 3 in SBFD symbols/slots. The information may further include at least one parameter indicating to the first apparatus 310 to perform the repeated transmission of the first Message 3 in both SBFD and non-SBFD resources or only on the non-SBFD resource.

In some example embodiments, the information may be indicated by reserved resources in a random access response. In an example, the reserved resources in a random access response may be reserved bits in the RAR. The reserved bits, for example, may be reserved Frequency Domain Resource Assignment (FDRA) bits when an initial uplink BandWidth Part (BWP) is smaller than a max bits range or may be MCS bits.

Alternatively, or in addition, in some example embodiments, the information may be indicated by an indication for a random access occasion for transmitting the random access request. For example, the random access occasion may be a dedicated RACH occasion (RO). In some example embodiments, the information may be indicated by an indication for second Message 3. In an example, the indication for second Message 3 may be a Message 1 RRC configuration parameter, for example, "Message 3-Twins-indication". In some example embodiments, the information may be indicated by a parameter set for first Message 3. For example, the parameter set for first Message 3 may be a dedicated special Message 3 parameter set.

In some example embodiments, the information may indicate a resource offset of the additional Message 3 transmission in a time domain. For example, the information may indicate that resources for the transmission of the second Message 3 are offset by $N_{forward}$ slots/symbols as compared to the uplink slots/symbols indicated by the uplink grant in the RAR or RRC.

Alternatively, or in addition, in some example embodiments, the information may indicate a start symbol of the additional Message 3 transmission in the time domain. In some example embodiments, the information may indicate a time length of the additional Message 3 transmission in the time domain. For example, the information may indicate the same start symbol and/or length symbol as indicated for the legacy uplink slot (for example, the non-SBFD slot).

Alternatively, or in addition, in some example embodiments, the information may indicate a start position of the additional Message 3 transmission in a frequency domain, for example, a default start position in the uplink subband configured by RRC.

Alternatively, or in addition, in some example embodiments, the information may indicate a frequency length of the additional Message 3 transmission in the frequency domain. In an example, the number of PRBs may be indicated, for example, as same as the number of PRBs allocated for the legacy uplink slot. In some example embodiments, the information may indicate a scaling factor for physical resource block (PRB) of the additional Message 3 transmission. For example, a scaling factor signaled in RACH configuration may be indicated.

Alternatively, or in addition, in some example embodiments, the information may indicate first Message 3 having multiple repetitions. In some example embodiments, the information may indicate a frequency offset of the additional Message 3 transmission. In some example embodiments, the information may indicate an MCS offset of the additional Message 3 transmission.

In some example embodiments, the first apparatus 310 may receive an indication whether the additional Message 3 transmission is enabled. For example, a parameter inside the RACH configuration may be used to indicate whether the transmission of the second Message 3 is enabled.

In some example embodiments, in case that the additional Message 3 transmission comprises a repeated transmission of first Message 3, and the first apparatus 310 may receive an indication whether the repeated transmission of the first Message 3 on both the SBFD resource and the non-SBFD resource or on the non-SBFD resource is counted into the total number of repeated transmissions of the first Message 3. For example, the second apparatus 320 may signal a set of parameters for the first apparatus 310 in the RACH configuration for SBFD slots/symbols to determine whether the number of Message 3 repetitions on both SBFD and non-SBFD resources should be counted or only on the non-SBFD resources, in case the first apparatus 310 sends Message 1 on the non-SBFD resources.

In some example embodiments, in accordance with a determination that the repeated transmission of the first Message 3 on both the SBFD resource and the non-SBFD resource is counted, the first apparatus 310 may determine a resource for the repeated transmission of the first Message 3, from available resources on both the SBFD resource and the non-SBFD resource, and perform the repeated transmission using the determined resources. For example, the resource for the repeated transmission of the first Message 3 may be determined by counting available resources on both the SBFD resource and the non-SBFD resources starting from the non-SBFD resource indicated in the RAR.

In some example embodiments, in accordance with a determination that the repeated transmission of the first Message 3 on the non-SBFD resource is counted, the first apparatus 310 may determine a resource for the repeated transmission of the first Message 3, from available resources on the non-SBFD resource. For example, the resource for the repeated transmission of the first Message 3 may be determined by counting available resources only on the non-SBFD resource starting from the non-SBFD resource indicated in the RAR.

Then, the first apparatus 310 receives (440) information indicating the part of at least one of the SBFD resource or the non-SBFD resource, and performs (450) the additional Message 3 transmission to the second apparatus 320 in the part of the at least one of the SBFD resource or the non-SBFD resource. Accordingly, the second apparatus 320 receives (460) the additional Message 3 transmission in the part of the at least one of the SBFD resource or the non-SBFD resource.

In some example embodiments, in accordance with a determination that signal quality of the transmission of the first Message 3 is greater than or equal to a first threshold, and/or less than or equal to a second threshold, the second apparatus 320 may decode the second Message 3.

Example processes of Message 3 enhancement for SBFD will be described in detail below with reference to FIG. 5 and FIG. 6.

Figure 5:
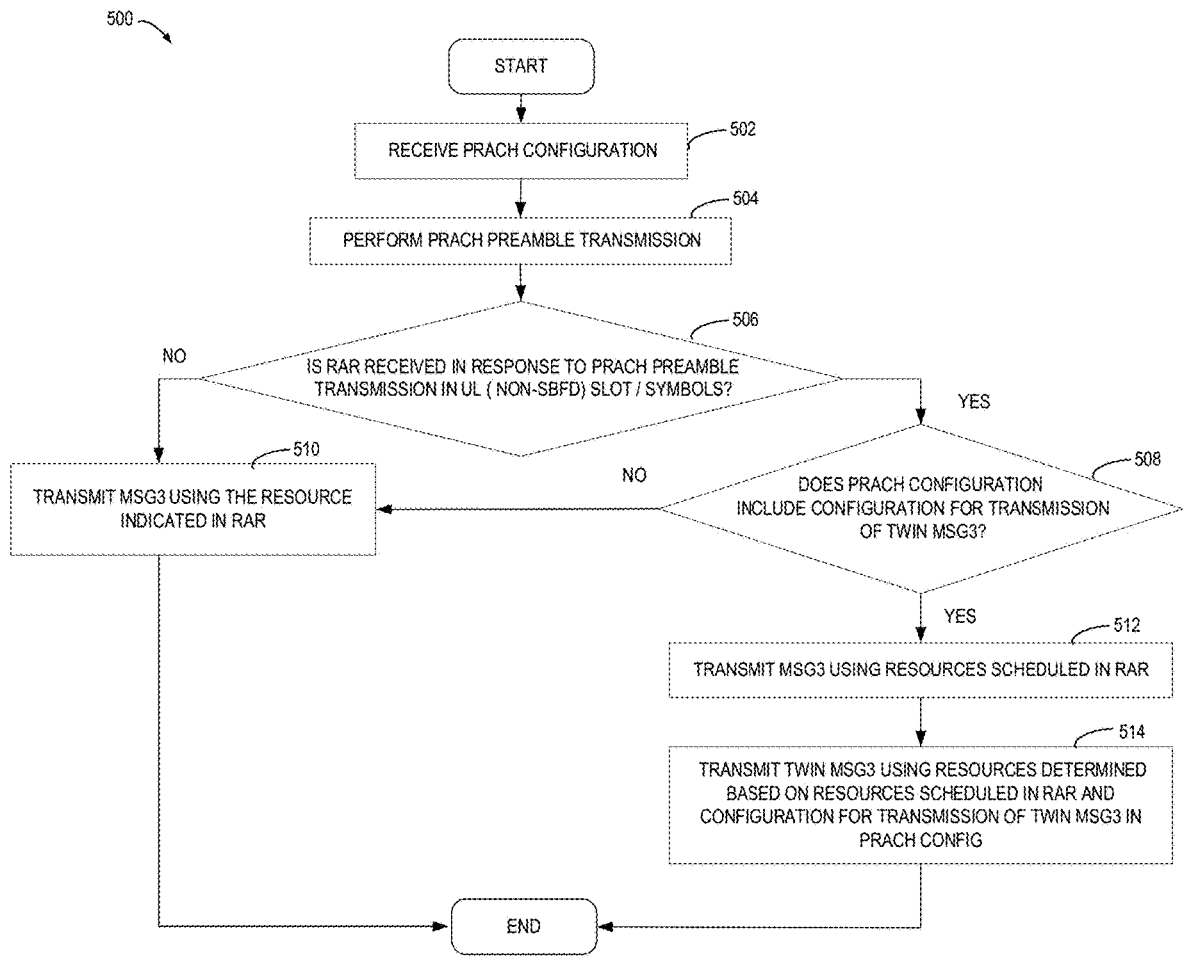
FIG. 5 illustrates a flowchart of an example process of Message 3 enhancement for SBFD in accordance with some example embodiments of the present disclosure.
Figure 6:
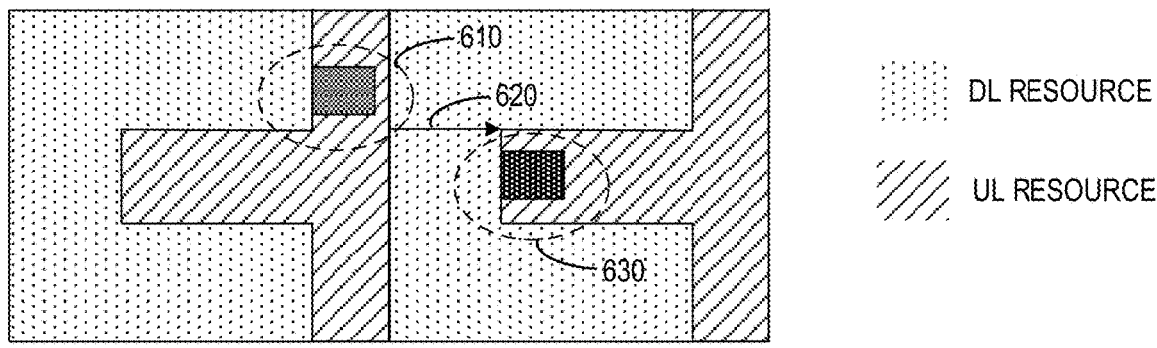
FIG. 6 illustrates a schematic diagram of an example resource for twin Message 3 determination according to some example embodiments of the present disclosure.

FIG. 5 illustrates a flowchart of an example process 500 of Message 3 enhancement for SBFD in accordance with some example embodiments of the present disclosure. In this example, an SBFD-aware UE operates as an example implementation of the first apparatus 310 in FIG. 3, and a gNB operates as an example implementation of the second apparatus 320 in FIG. 3.

As shown in FIG. 5, in the process 500, at 502, the SBFD-aware UE receives a PRACH configuration (also referred to as RACH configuration) including at least one parameter indicating to the SBFD-aware UE to transmit Message 3 on both scheduled resources in the RAR and on twin resources. The PRACH configuration may also include information for the SBFD-aware UE to determine twin resources based on scheduled resources in the RAR.

In some example embodiments, the PRACH configuration may include a number of slots/symbols. As an example, the frequency band of the resources may be split into multiple subbands and at least one subband is used for downlink transmissions and at least one subband is used for uplink transmissions, the PRACH configuration may include SBFD slots/symbols, and the location and the number of slots/symbols in a radio frame. Alternatively, or in addition, the entire frequency band of the resources may be used for downlink transmissions or uplink transmissions, so that the PRACH configuration may include, such as non-SBFD slots/symbols, or downlink/uplink legacy slots/symbols, and the location and the number of slots/symbols in a radio frame.

Alternatively, or in addition, the RACH configuration may include both uplink legacy and SBFD slots/symbols. In the RACH configuration for SBFD slots/symbols, the gNB may further signal a set of parameters for the UE to determine whether the SBFD-aware UE should transmit a twin Message 3 in SBFD slots/symbols. As an example, in the configuration of twin Message 3, the set of parameters may include reserved bits in the RAR or MCS bits, for example, reserved FDRA bits when an initial UL BWP is smaller than a max bits range. In addition, the set of parameters may include special RO or preamble sets, or special Message 3 parameter sets may be configured to the UE, and the UE may use the configured resource/preamble/parameter for PRACH/Message 3 transmission and may have twin Msg3. In this way, it is helpful for the gNB to identify the twin Message 3. In an example, in order to improve coverage, the twin Message 3 may only be configured for cell edge UEs, and MCS may be lower than some level.

Alternatively, or in addition, in the RACH configuration for SBFD slots/symbols, the gNB may also signal a set of parameters for the UE to determine resources for the transmission of the twin Message 3 in SBFD slots/symbols based on resources indicate in the RAR.

At 504, the SBFD-aware UE may transmit a PRACH preamble in uplink legacy or SBFD slots/symbols. At 506, the SBFD-aware UE may determine whether the RAR is received in response to the transmission of the PRACH preamble in uplink slots/symbols (for example, non-SBFD slots/symbols). At 508, upon receiving an RAR in response to the PRACH preamble, the SBFD-aware UE may determine whether the PRACH configuration includes a configuration for transmission of twin Message 3.

At 512, if the RACH configuration includes the configuration for transmission of twin Message 3, the UE transmits Message 3 using resources indicated in the RAR and at 514, transmits twin Message 3 using twin resources determined based on resources indicated in the RAR and the set of parameters for transmission of twin Message 3 indicated in the RACH configuration. At 510, if the PRACH configuration does not include the configuration for transmission of twin Message 3, then the UE transmits Message 3 using the resource indicated in the RAR.

In some example embodiments, the twin resources may be offset by $N_{forward}$ slots/symbols in a time domain as compared to the uplink slots/symbols indicated by the uplink grant in the RAR or RRC. Alternatively, or in addition, the twin resources may be applied with the same start symbols and/or length symbols as indicated for legacy uplink slot. FIG. 6 illustrates a schematic diagram of an example resource for twin Message 3 determination according to some example embodiments of the present disclosure. In this example, $N_{forward}$ is assumed as 1. As shown in FIG. 6, an uplink grant in the RAR may only indicate a resource for legacy Message 3 (i.e., Message 3) 610. The twin resource may be offset by $N_{forward}$ slots/symbols 620 in a time domain as compared to the resource for legacy Message 3, therefore the resource for twin Message 3 630 can be determined.

Alternatively, or in addition, the twin resources may be applied with a default starting position in uplink subband configured by RRC, and/or an offset relative to a starting position of the resource in legacy uplink slot configured by RRC in a frequency domain. The offsets may be indicated dynamically, for example, by grouping multiple rows in a TDRA and/or an FDRA table to be associated with one offset value. It is to be noted that if frequency domains of the SBFD and non-SBFD slots are overlapped for Message 3, the same FDRA may be used for both the SBFD and non-SBFD slots.

Alternatively, or in addition, the twin resources may include PRBs, and the number of PRBs may be as same as the number of PRBs allocated for the legacy uplink slot. The twin resources may be applied with a scaling factor signaled in RACH configuration. In addition, other offsets, for example, a frequency offset, a PRB scaling factor, an MCS offset, or the like may be configured in RACH configuration by RRC and used to determine twin Message 3 resources.

In some example embodiments, a MSG3-twins-indication parameter inside the rach-ConfigGeneric information element (IE) may be provided for SBFD-aware UEs to enhance Message 3 coverage and robustness. A $N_{forward}$ parameter (i.e., N_forward) inside the rach-ConfigGeneric IE is provided for more flexible Message 3. An example RACH configuration via RRC signaling with two new parameters MSG3-twins-indication and N_forward inside the rach-ConfigGeneric IE defined for the SBFD-aware UE is provided below.

preamble resources may be utilized more efficiently while reducing the initial access delay.

Figure 7:
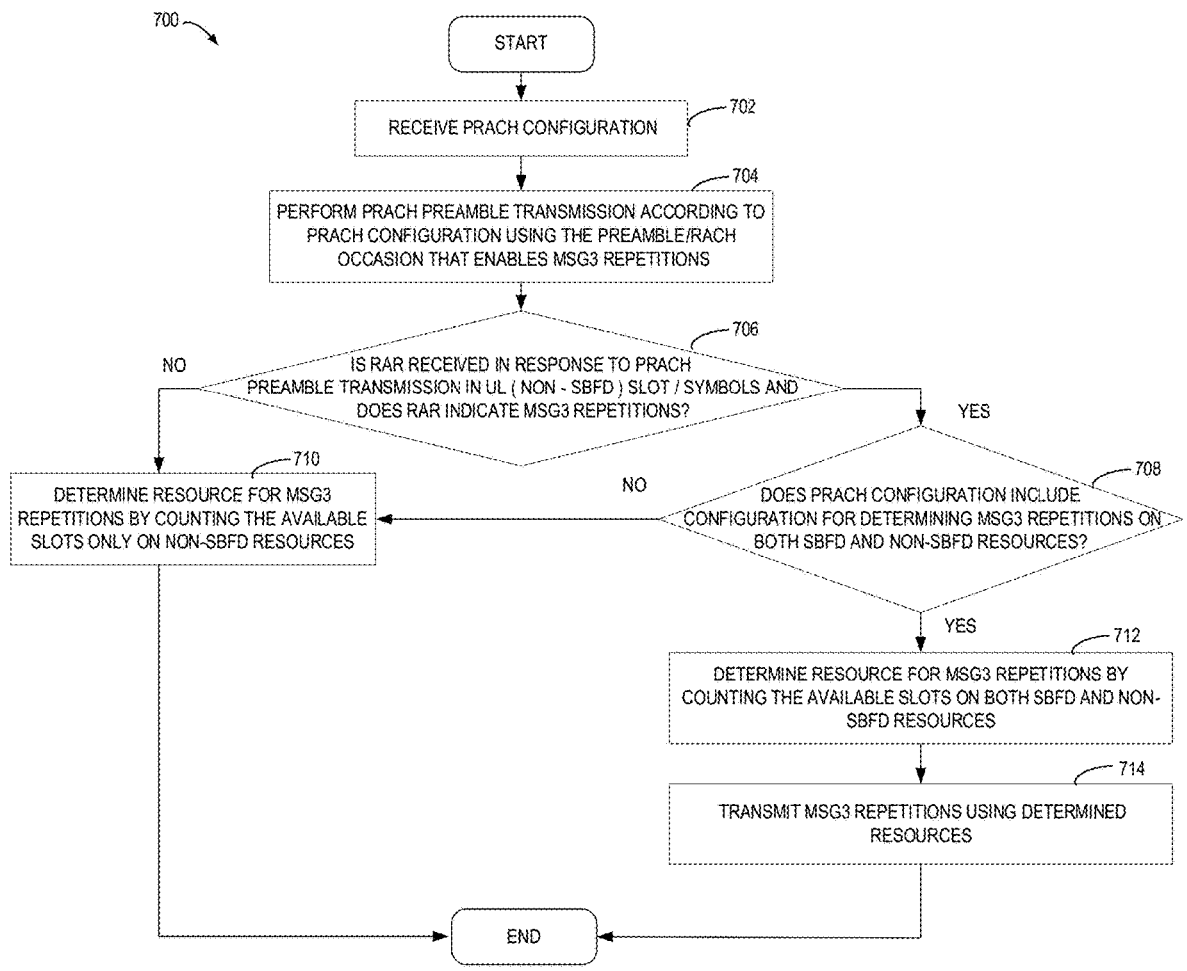
FIG. 7 illustrates a flowchart of an example process of Message 3 enhancement for SBFD in accordance with some example embodiments of the present disclosure.

FIG. 7 illustrates a flowchart of an example process 700 of Message 3 enhancement for SBFD in accordance with some example embodiments of the present disclosure. In this example, an SBFD-aware UE operates as an example implementation of the first apparatus 310 in FIG. 3, and a gNB operates as an example implementation of the second apparatus 320 in FIG. 3.

As shown in FIG. 7, in the process 700, at 702, the SBFD-aware UE receives a PRACH configuration including at least one parameter indicating to the SBFD-aware UE to transmit Message 3 with repetitions on both SBFD and non-SBFD resources or only on the latter, in case the SBFD-aware UE transmitted Message 1 on legacy uplink (for example, non-SBFD) slots/resources, and Message 3 repetition is enabled for the UE.

In some example embodiments, the PRACH configuration may include a number of slots/symbols. As an example, the frequency band of the resources may be split into multiple subbands and at least one subband is used for downlink transmissions and at least one subband is used for uplink transmissions, the PRACH configuration may include

```
RACH-ConfigGeneric : :=      SEQUENCE  {
    prach-ConfigurationIndex        INTEGER   (0..255),
    msg1-FDM                        ENUMERATED   {one, two, four, eight},
    msg1-FrequencyStart             INTEGER   (0..maxNrofPhysicalResourceBlocks-1) ,
    zeroCorrelationZoneConfig       INTEGER   (0..15),
    preambleReceivedTargetPower     INTEGER   (-202..-60) ,
    preambleTransMax                ENUMERATED   {n3, n4, n5, n6, n7, n8, n10, n20, n50,
n100, n200},
    powerRampingStep                ENUMERATED   {dB0, dB2, dB4, dB6},
    ra-ResponseWindow               ENUMERATED   {s11, s12, s14, s18, s110, s120, s140,
s180},
    ...,
    MSG3-Twins-indication           ENUMERATED {ENABLE, DISABLE} ,
    N_forward                       INTEGER {-3, -2, -1, 0, 1, 2, 3...} ,
}
```

Alternatively, or in addition, more complex configurations may be supported. In such configurations, a time offset to be applied for determination of time resources for the transmission of twin MSG3 is dependent on the uplink slot and symbols indicated by TDRA in the RAR. One resource indication signaled in the RAR may point to at least two sets of resources, one set to be used for the twin Message 3 transmission in SBFD slots/symbols and the other set to be used for the first Message 3 transmission in legacy uplink slots/symbols. In this case, after transmitting the RAR in response to a PRACH preamble received in uplink legacy slot, the gNB may monitor two Message 3 locations. The gNB may only attempt to decode twin Message 3 in twin resources when the signal strength or quality is greater than or equal to a first threshold and/or is less than or equal to a second threshold. In this way, the gNB may identify SBFD-aware UEs by detecting the transmission of twin Message 3 in SBFD slots/symbols. It is to be noted that if the gNB can identify an SBFD-aware UE in Message 1, the twin Message 3 still can be used for coverage enhancement scenario.

According to the embodiments of the present disclosure, capabilities of SBFD-aware UEs may be identified earlier, while capability determination by a UE from Message 1 can be avoided, thereby reducing the cost as a set of RACH preamble resources in an uplink legacy slot needs to be reserved for SBFD-aware UEs. Furthermore, Message 3 coverage and robustness may be enhanced, and PRACH SBFD slots/symbols, and the location and the number of slots/symbols in a radio frame. Alternatively, or in addition, the entire frequency band of the resources may be used for downlink transmissions or uplink transmissions, so that the PRACH configuration may include, such as non-SBFD slots/symbols, or downlink/uplink legacy slots/symbols, and the location and the number of slots/symbols in a radio frame.

Alternatively, or in addition, the RACH configuration may include both uplink legacy and SBFD slots/symbols. In the RACH configuration for SBFD slots/symbols, the gNB may further signal a set of parameters for an SBFD-aware UE to determine whether the number of Message 3 repetitions on both SBFD and non-SBFD resources or only on the latter should be counted, in case the UE sends Message 1 on the non-SBFD resources.

At 704, the UE performs a PRACH preamble transmission according to the PRACH configuration on the non-SBFD resources using the preamble/RACH occasion that enables Message 3 repetitions. In response to the preamble reception, the gNB may transmit an RAR in Medium Access Control-Control Element (MAC-CE) for scheduling an initial transmission of Message 3 or a DCI format 0_0 with CRC scrambled by TC-RNTI for scheduling a retransmission of Message 3 that schedules a Message 3 transmission with multiple repetitions. The RAR or DCI format 0_0 may include resource allocation on non-SBFD resource for a first repetition of the Message 3 repetitions.

At 706, the UE determines whether the RAR is received in response to the PRACH preamble transmission in uplink (for example, non-SBFD) slots/symbols and whether the RAR indicates Message 3 repetitions.

At 708, if the UE determines the RAR is received in response to the PRACH preamble transmission in uplink slots/symbols and the RAR indicates Message 3 repetitions, the UE may determine whether the PRACH configuration includes a configuration for determining Message 3 repetitions on both SBFD and non-SBFD resources even if Message 1 is received on the non-SBFD resource. As an example, upon receiving the RAR or the DCI format 0_0 with CRC scrambled by TC-RNTI from the gNB, the UE may determine whether it should count the number of Message 3 repetitions on both SBFD and non-SBFD resources or only on the non-SBFD resource based on the set of configured parameters.

At 712, if the PRACH configuration (for example, the set of parameters in the PRACH configuration) includes a configuration for determining Message 3 repetitions on both SBFD and non-SBFD resources (in case the UE sends Message 1 on non-SBFD resource), the UE may determine a resource for Message 3 repetitions by counting the available slots on both SBFD and non-SBFD resources, for example, starting from the non-SBFD resource indicated in the RAR. At 714, the UE may transmit Message 3 repetitions using the resources determined at 712.

At 710, if the PRACH configuration (for example, the set of parameters in the PRACH configuration) indicates that the UE should count the number of Message 3 repetitions only on non-SBFD resources (in case the UE sends Message 1 on non-SBFD resource), the UE may determine a resource for Message 3 repetitions by counting the available slots only on non-SBFD resources, for example, starting from the non-SBFD resource indicated in the RAR.

According to the embodiments of the present disclosure, the gNB is able to signal to the UE whether the gNB should apply blind detection on SBFD resources, and the latency of the RACH process may be reduced and the coverage of Message 3 may be improved due to the usage of the SBFD resource in case the UE sends Message 1 on legacy uplink slots/resources.

Figure 8:
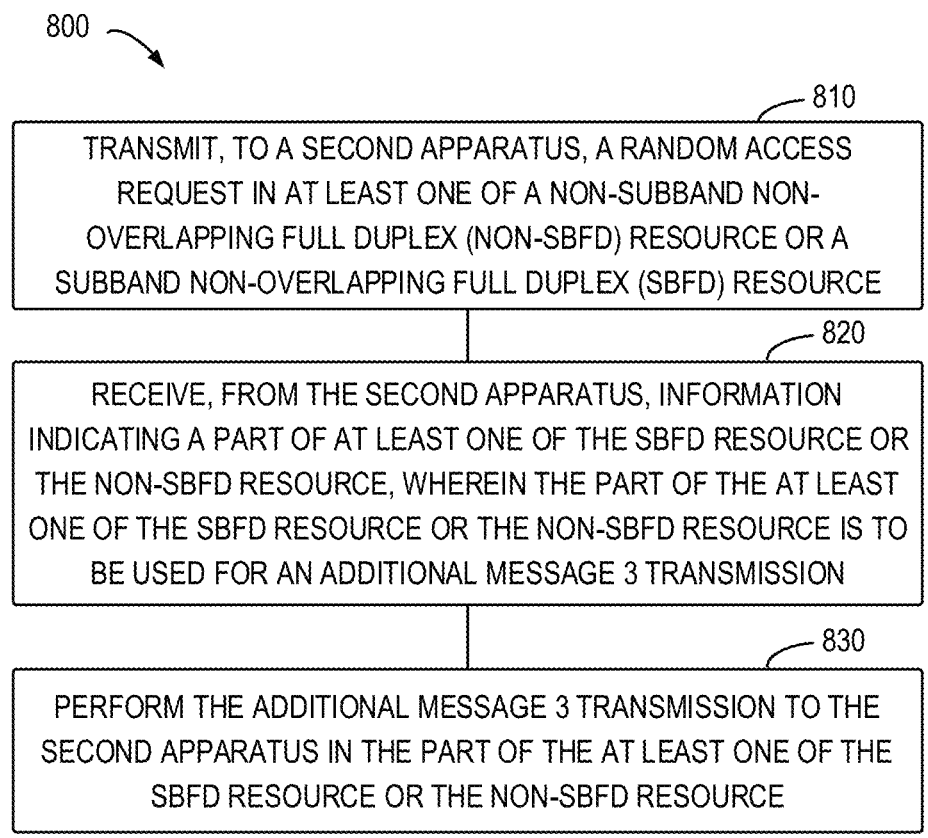
FIG. 8 shows a flowchart of an example method implemented at a first apparatus in accordance with some example embodiments of the present disclosure.

FIG. 8 shows a flowchart of an example method 800 implemented at a first apparatus in accordance with some example embodiments of the present disclosure. For the purpose of discussion, the method 800 will be described from the perspective of the first apparatus 310 in FIG. 3.

At block 810, the first apparatus 310 transmits, to a second apparatus, a random access request in at least one of a non-subband non-overlapping full duplex (non-SBFD) resource or a subband non-overlapping full duplex (SBFD) resource.

At block 820, the first apparatus 310 receives, from the second apparatus, information indicating a part of at least one of the SBFD resource or the non-SBFD resource, wherein the part of the at least one of the SBFD resource or the non-SBFD resource is to be used for an additional Message 3 transmission.

At block 830, the first apparatus 310 performs the additional Message 3 transmission to the second apparatus in the part of the at least one of the SBFD resource or the non-SBFD resource.

In some example embodiments, the additional Message 3 transmission comprises at least one of a repeated transmission of first Message 3 or a transmission of second Message 3.

In some example embodiments, the second Message 3 is transmitted using resources independent of resources for the first Message 3.

In some example embodiments, the first Message 3 or the second Message 3 comprises Message 3.

In some example embodiments, the first apparatus receives a random access configuration, the random access configuration indicating the at least one of the SBFD resource or the non-SBFD resource.

In some example embodiments, the random access configuration includes the information indicating the part of the at least one of the SBFD resource or the non-SBFD resource.

In some example embodiments, the information is indicated by at least one of: reserved resources in a random access response, an indication for a random access occasion for transmitting the random access request, an indication for second Message 3, or a parameter set for first Message 3.

In some example embodiments, the first apparatus 310 receives an indication whether the additional Message 3 transmission is enabled.

In some example embodiments, the information indicates at least one of: a resource offset of the additional Message 3 transmission in a time domain; a start symbol of the additional Message 3 transmission in the time domain; a time length of the additional Message 3 transmission in the time domain; a start position of the additional Message 3 transmission in a frequency domain; a frequency length of the additional Message 3 transmission in the frequency domain; first Message 3 having multiple repetitions; a frequency offset of the additional Message 3 transmission; a scaling factor for physical resource block (PRB) of the additional Message 3 transmission; or an MCS offset of the additional Message 3 transmission.

In some example embodiments, the additional Message 3 transmission comprises a repeated transmission of first Message 3, and the first apparatus receives an indication whether the repeated transmission of the first Message 3 on both the SBFD resource and the non-SBFD resource or on the non-SBFD resource is counted into the total number of repeated transmissions of the first Message 3.

In some example embodiments, the first apparatus 310, in accordance with a determination that the repeated transmission of the first Message 3 on both the SBFD resource and the non-SBFD resource is counted, determines a resource for the repeated transmission of the first Message 3, from available resources on both the SBFD resource and the non-SBFD resource; and performs the repeated transmission using the determined resources.

In some example embodiments, the first apparatus 310, in accordance with a determination that the repeated transmission of the first Message 3 on the non-SBFD resource is counted, determines a resource for the repeated transmission of the first Message 3, from available resources on the non-SBFD resource.

In some example embodiments, the SBFD resource comprises at least one of a plurality of SBFD slots or a plurality of SBFD symbols.

In some example embodiments, the first apparatus comprises a terminal device, and the second apparatus comprises a network device.

In some example embodiments, a first apparatus capable of performing any of the method 800 (for example, the first apparatus 310 in FIG. 3) may comprise means for performing the respective operations of the method 800. The means may be implemented in any suitable form. For example, the means may be implemented in a circuitry or software module. The apparatus may be implemented as or included in the first apparatus 310 in FIG. 3.

Figure 9:
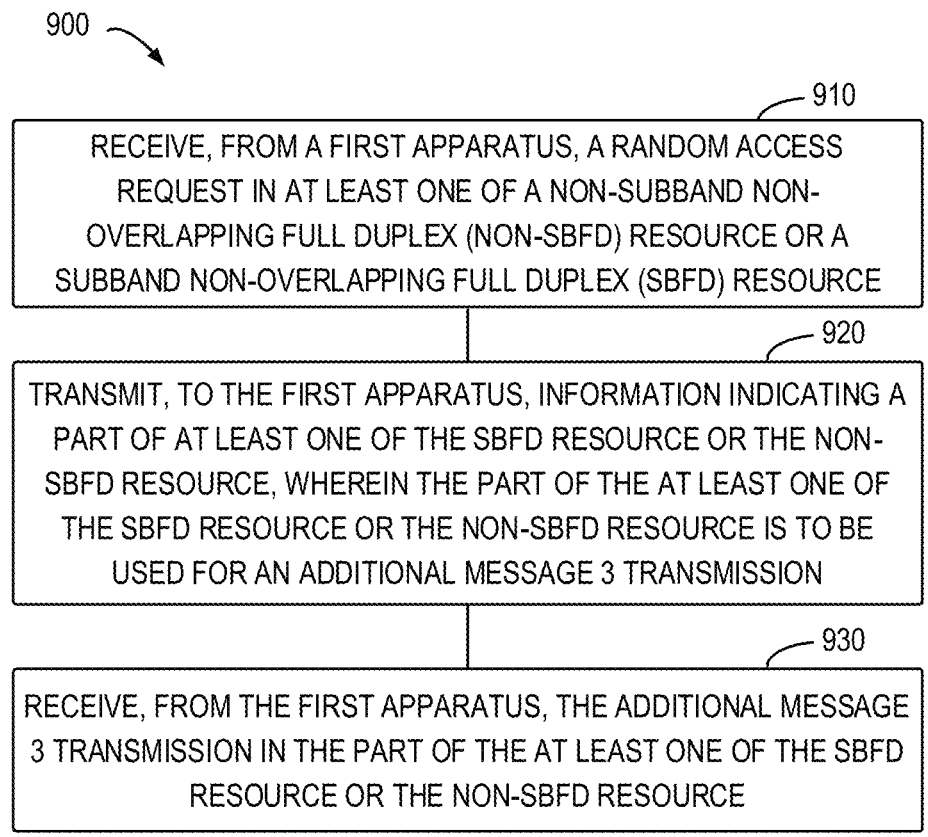
FIG. 9 shows a flowchart of an example method implemented at a second apparatus in accordance with some example embodiments of the present disclosure.

FIG. 9 shows a flowchart of an example method 900 implemented at a second apparatus in accordance with some example embodiments of the present disclosure. For the purpose of discussion, the method 900 will be described from the perspective of the second apparatus 320 in FIG. 3.

At block 910, the second apparatus 320 receives, from a first apparatus, a random access request in at least one of a non-subband non-overlapping full duplex (non-SBFD) resource or a subband non-overlapping full duplex (SBFD) resource.

At block 920, the second apparatus 320 transmits, to the first apparatus, information indicating a part of at least one of the SBFD resource or the non-SBFD resource, wherein the part of the at least one of the SBFD resource or the non-SBFD resource is to be used for an additional Message 3 transmission.

At block 930, the second apparatus 320 receives, from the first apparatus, the additional Message 3 transmission in the part of the at least one of the SBFD resource or the non-SBFD resource.

In some example embodiments, the additional Message 3 transmission comprises at least one of a repeated transmission of first Message 3 or a transmission of second Message 3.

In some example embodiments, the second Message 3 is transmitted using resources independent of resources for the first Message 3.

In some example embodiments, the first Message 3 or the second Message 3 comprises Message 3.

In some example embodiments, the second apparatus 320 transmits a random access configuration, the random access configuration indicating the at least one of the SBFD resource or the non-SBFD resource.

In some example embodiments, the random access configuration includes the information indicating the part of the at least one of the SBFD resource or the non-SBFD resource.

In some example embodiments, the information is indicated by at least one of: reserved resources in a random access response, an indication for a random access occasion for transmitting the random access request, an indication for second Message 3, or a parameter set for first Message 3.

In some example embodiments, the second apparatus 320 transmits an indication whether the additional Message 3 transmission is enabled.

In some example embodiments, the information indicates at least one of: a resource offset of the additional Message 3 transmission in a time domain; a start symbol of the additional Message 3 transmission in the time domain; a time length of the additional Message 3 transmission in the time domain; a start position of the additional Message 3 transmission in a frequency domain; a frequency length of the additional Message 3 transmission in the frequency domain; first Message 3 having multiple repetitions; a frequency offset of the additional Message 3 transmission; a scaling factor for physical resource block (PRB) of the additional Message 3 transmission; or an MCS offset of the additional Message 3 transmission.

In some example embodiments, the addition Message 3 transmission comprises a transmission of second Message 3, and second apparatus, in accordance with a determination that signal quality of the transmission of the first Message 3 is greater than or equal to a first threshold, and/or less than or equal to a second threshold, decodes the second Message 3.

In some example embodiments, the additional Message 3 transmission comprises a repeated transmission of first Message 3, and the second apparatus transmits an indication whether a repeated transmission of first Message 3 on both the SBFD resource and the non-SBFD resource or on the non-SBFD resource is counted into the total number of repeated transmission of the first Message 3.

In some example embodiments, the SBFD resource comprises at least one of a plurality of SBFD slots or a plurality of SBFD symbols.

In some example embodiments, the first apparatus comprises a terminal device, and the second apparatus comprises a network device.

Figure 10:
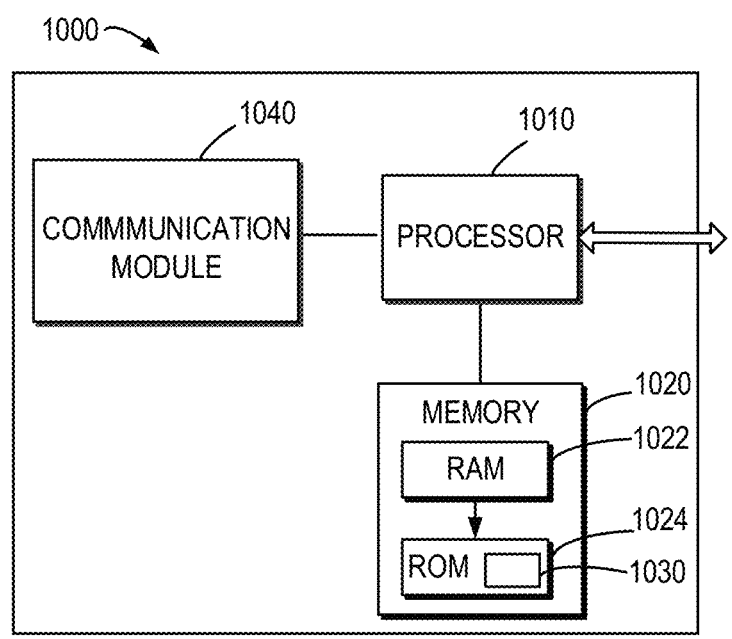
FIG. 10 illustrates a simplified block diagram of a device that is suitable for implementing example embodiments of the present disclosure.

FIG. 10 is a simplified block diagram of a device 1000 that is suitable for implementing example embodiments of the present disclosure. The device 1000 may be provided to implement a communication device, for example, the first apparatus 310 or the second apparatus 320 as shown in FIG. 3. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has one or more communication interfaces to facilitate communication with one or more other modules or devices. The communication interfaces may represent any interface that is necessary for communication with other network elements. In some example embodiments, the communication module 1040 may include at least one antenna.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The instructions of the program 1030 may include instructions for performing operations/acts of some example embodiments of the present disclosure. The program 1030 may be stored in the memory, e.g., the ROM 1024. The processor 1010 may perform any suitable actions and processing by loading the program 1030 into the RAM 1022.

The example embodiments of the present disclosure may be implemented by means of the program 1030 so that the device 1000 may perform any process of the disclosure as discussed with reference to FIG. 1 to FIG. 7. The example embodiments of the present disclosure may also be implemented by hardware or by a combination of software and hardware.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 11:
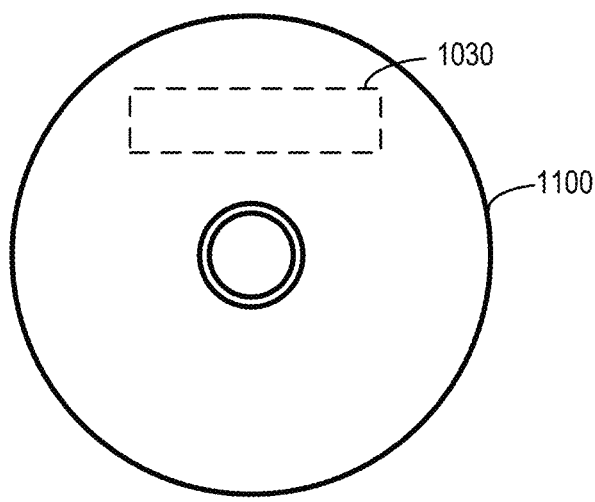
FIG. 11 illustrates a block diagram of an example computer readable medium in accordance with some example embodiments of the present disclosure.

FIG. 11 shows an example of the computer readable medium 1100 which may be in form of CD, DVD or other optical storage disk. The computer readable medium 1100 has the program 1030 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
   at least one processor; and
   at least one memory storing instructions that, when executed by the at least one processor, cause the first apparatus at least to:
   transmit, to a second apparatus, a random access request in at least one of a non-subband non-overlapping full duplex (non-SBFD) resource or a subband non-overlapping full duplex (SBFD) resource;
   receive, from the second apparatus, information indicating a part of at least one of the SBFD resource or the non-SBFD resource, wherein the part of the at least one of the SBFD resource or the non-SBFD resource is to be used for an additional Message 3 transmission; and
   perform the additional Message 3 transmission to the second apparatus in the part of the at least one of the SBFD resource or the non-SBFD resource.

2. The first apparatus of claim 1, wherein the additional Message 3 transmission comprises at least one of a repeated transmission of first Message 3 or a transmission of second Message 3.

3. The first apparatus of claim 2, wherein the second Message 3 is transmitted using resources independent of resources for the first Message 3.

4. The first apparatus of claim 2, wherein the first Message 3 or the second Message 3 comprises Message 3.

5. The first apparatus of claim 1, wherein the at least one memory and the at least one processor further cause the first apparatus to:

receive a random access configuration, the random access configuration indicating the at least one of the SBFD resource or the non-SBFD resource.

6. The first apparatus of claim 1, wherein the information is indicated by at least one of:
reserved resources in a random access response,
an indication for a random access occasion for transmitting the random access request,
an indication for second Message 3, or
a parameter set for first Message 3.

7. The first apparatus of claim 1, wherein the information indicates at least one of:
a resource offset of the additional Message 3 transmission in a time domain;
a start symbol of the additional Message 3 transmission in the time domain;
a time length of the additional Message 3 transmission in the time domain;
a start position of the additional Message 3 transmission in a frequency domain;
a frequency length of the additional Message 3 transmission in the frequency domain; first Message 3 having multiple repetitions;
a frequency offset of the additional Message 3 transmission;
a scaling factor for physical resource block (PRB) of the additional Message 3 transmission; or
an MCS offset of the additional Message 3 transmission.

8. The first apparatus of claim 1, wherein the additional Message 3 transmission comprises a repeated transmission of first Message 3, and the at least one memory and the at least one processor further cause the first apparatus to:
receive an indication whether the repeated transmission of the first Message 3 on both the SBFD resource and the non-SBFD resource or on the non-SBFD resource is counted into the total number of repeated transmissions of the first Message 3.

9. The first apparatus of claim 8, wherein the at least one memory and the at least one processor further cause the first apparatus to:
in accordance with a determination that the repeated transmission of the first Message 3 on both the SBFD resource and the non-SBFD resource is counted, determine a resource for the repeated transmission of the first Message 3, from available resources on both the SBFD resource and the non-SBFD resource; and
perform the repeated transmission using the determined resources.

10. The first apparatus of claim 8, wherein the at least one memory and the at least one processor further cause the first apparatus to:
in accordance with a determination that the repeated transmission of the first Message 3 on the non-SBFD resource is counted, determine a resource for the repeated transmission of the first Message 3, from available resources on the non-SBFD resource.

11. A second apparatus comprising:
at least one processor; and
at least one memory storing instructions that, when executed by the at least one processor, cause the second apparatus at least to:
receive, from a first apparatus, a random access request in at least one of a non-subband non-overlapping full duplex (non-SBFD) resource or a subband non-overlapping full duplex (SBFD) resource;
transmit, to the first apparatus, information indicating a part of at least one of the SBFD resource or the non-SBFD resource, wherein the part of the at least one of the SBFD resource or the non-SBFD resource is to be used for an additional Message 3 transmission; and
receive, from the first apparatus, the additional Message 3 transmission in the part of the at least one of the SBFD resource or the non-SBFD resource.

12. The second apparatus of claim 11, wherein the additional Message 3 transmission comprises at least one of a repeated transmission of first Message 3 or a transmission of second Message 3.

13. The second apparatus of claim 12, wherein the second Message 3 is transmitted using resources independent of resources for the first Message 3.

14. The second apparatus of claim 12, wherein the first Message 3 or the second Message 3 comprises Message 3.

15. The second apparatus of claim 11, wherein the at least one memory and the at least one processor further cause the second apparatus to:
transmit a random access configuration, the random access configuration indicating the at least one of the SBFD resource or the non-SBFD resource.

16. The second apparatus of claim 11, wherein the information is indicated by at least one of:
reserved resources in a random access response,
an indication for a random access occasion for transmitting the random access request,
an indication for second Message 3, or
a parameter set for first Message 3.

17. The second apparatus of claim 11, wherein the information indicates at least one of:
a resource offset of the additional Message 3 transmission in a time domain;
a start symbol of the additional Message 3 transmission in the time domain;
a time length of the additional Message 3 transmission in the time domain;
a start position of the additional Message 3 transmission in a frequency domain;
a frequency length of the additional Message 3 transmission in the frequency domain; first Message 3 having multiple repetitions;
a frequency offset of the additional Message 3 transmission;
a scaling factor for physical resource block (PRB) of the additional Message 3 transmission; or
an MCS offset of the additional Message 3 transmission.

18. The second apparatus of claim 11, wherein the addition Message 3 transmission comprises a transmission of second Message 3, and the at least one memory and the at least one processor further cause the second apparatus to:
in accordance with a determination that signal quality of the transmission of the first Message 3 is greater than or equal to a first threshold, and/or less than or equal to a second threshold, decode the second Message 3.

19. The second apparatus of claim 11, wherein the additional Message 3 transmission comprises a repeated transmission of first Message 3, and the at least one memory and the at least one processor further cause the second apparatus to:
transmit an indication whether a repeated transmission of first Message 3 on both the SBFD resource and the non-SBFD resource or on the non-SBFD resource is counted into the total number of repeated transmission of the first Message 3.

20. A first apparatus comprising:
means for transmitting, to a second apparatus, a random access request in at least one of a non-subband non-overlapping full duplex (non-SBFD) resource or a subband non-overlapping full duplex (SBFD) resource;

means for receiving, from the second apparatus, information indicating a part of at least one of the SBFD resource or the non-SBFD resource, wherein the part of the at least one of the SBFD resource or the non-SBFD resource is to be used for an additional Message 3 transmission; and means for performing the additional Message 3 transmission to the second apparatus in the part of the at least one of the SBFD resource or the non-SBFD resource.

* * * * *